United States Patent
Kurihara (10) Patent No.: US 9,972,095 B2
(45) Date of Patent: May 15, 2018

(54) IMAGE MEASURING APPARATUS AND NON-TEMPORARY RECORDING MEDIUM ON WHICH CONTROL PROGRAM OF SAME APPARATUS IS RECORDED

(71) Applicant: MITUTOYO CORPORATION, Kawasaki, Kanagawa (JP)

(72) Inventor: Masaki Kurihara, Kawasaki (JP)

(73) Assignee: MITUTOYO CORPORATION, Kawasaki (JP)

( * ) Notice: Subject to any disclaimer, the term of this patent is extended or adjusted under 35 U.S.C. 154(b) by 0 days. days.

(21) Appl. No.: 15/250,313

(22) Filed: Aug. 29, 2016

(65) Prior Publication Data

US 2017/0061649 A1    Mar. 2, 2017

(30) Foreign Application Priority Data

Aug. 31, 2015  (JP) ................. 2015-170616

(51) Int. Cl.
| | | |
|---|---|---|
| *G06K 9/00* | (2006.01) | |
| *G06T 7/11* | (2017.01) | |
| *G06T 7/12* | (2017.01) | |
| *G06T 7/62* | (2017.01) | |

(52) U.S. Cl.
CPC .............. *G06T 7/11* (2017.01); *G06T 7/12* (2017.01); *G06T 7/62* (2017.01); *G06T 2207/30164* (2013.01)

(58) Field of Classification Search
CPC ......... G06T 2207/30148; G06T 7/0004; G06T 2207/30164; G06T 2207/10004
USPC ....... 382/140, 141, 149, 152, 170, 266, 274, 382/275; 358/3.26, 3.27
See application file for complete search history.

(56) References Cited

U.S. PATENT DOCUMENTS 7,065,239 B2 * 6/2006 Maayah ................ G06T 7/0004
                                                    250/559.22
7,071,468 B2 * 7/2006 Miyai ................ G01N 23/2251
                                                    250/306
7,075,076 B2 * 7/2006 Makino .................. G01N 23/04
                                                    250/310

(Continued)

FOREIGN PATENT DOCUMENTS

EP    0 887 769 A1    12/1998
JP    03-238969       10/1991

(Continued)

OTHER PUBLICATIONS

Print-outs (5 pages) from website at http://opencv.jp/sample/segmentation_and_connection.html, Oct. 14, 2007.

*Primary Examiner* — Yosef Kassa
(74) *Attorney, Agent, or Firm* — Rankin, Hill & Clark LLP (57) ABSTRACT

An image measuring apparatus according to an embodiment of the present invention comprises: an imaging device that images a workpiece to acquire an image of this workpiece; and a processing device that performs measurement of the workpiece based on this image and outputs a measurement result. Moreover, the processing device, based on the above-described image, generates another image whose number-of-pixels is smaller than that of the image, sets a plurality of regions based on this another image, and calculates the above-described measurement result based on these plurality of regions.

16 Claims, 8 Drawing Sheets

(56) References Cited

U.S. PATENT DOCUMENTS

| | | | | |
|---|---|---|---|---|
| 7,324,682 B2* | 1/2008 | Wasserman | ............ | G06T 7/0004 382/145 |
| 7,454,053 B2* | 11/2008 | Bryll | ..................... | G06T 7/0004 382/152 |
| 7,684,609 B1* | 3/2010 | Toth | ........................ | G06T 7/001 382/141 |
| 8,111,905 B2* | 2/2012 | Campbell | .......... | G01B 11/0608 348/86 |
| 8,111,938 B2* | 2/2012 | Bryll | ........................ | G02B 7/36 382/255 |
| 8,503,757 B2* | 8/2013 | Naruse | .................... | G06T 7/001 382/152 |
| 8,611,638 B2* | 12/2013 | Nagahama | ....... | G01N 21/95607 382/145 |

FOREIGN PATENT DOCUMENTS

| | | |
|---|---|---|
| JP | 2001-241941 | 9/2001 |
| JP | 2004-239761 | 8/2004 |

* cited by examiner

IMAGE MEASURING APPARATUS AND NON-TEMPORARY RECORDING MEDIUM ON WHICH CONTROL PROGRAM OF SAME APPARATUS IS RECORDED

CROSS-REFERENCE TO RELATED APPLICATIONS

This application is based upon and claims the benefit of Japanese Patent Application No. 2015-170616, filed on Aug. 31, 2015, the entire contents of which are incorporated herein by reference.

FIELD

The present invention relates to an image measuring apparatus that measures a workpiece by imaging the workpiece, and relates to a non-temporary recording medium on which a control program of the image measuring apparatus is recorded.

BACKGROUND

Description of the Related Art

A measuring apparatus that performs dimensional measurement or form measurement for a workpiece, is known. As an example of such a measuring apparatus, an image measuring apparatus comprising: an imaging device that images the workpiece to acquire an image of this workpiece; and a processing device that performs the likes of dimensional measurement or form measurement of the workpiece based on this image, is known (JP 2001-241941 A). In such measurement, the likes of a central position or a form, contour line, width, and so on, of a measurement target, for example, are calculated.

Sometimes, when, for example, the image measuring apparatus was employed to measure the workpiece, the likes of dimensional measurement or form measurement could not be preferably performed due to an effect of noise included in the image.

The present invention was made in view of such a point, and has an object of providing an image measuring apparatus capable of reducing noise in the image to preferably perform the likes of dimensional measurement or form measurement, and of providing a non-temporary recording medium on which a control program of the image measuring apparatus is recorded.

DETAILED DESCRIPTION

In order to solve the above-mentioned problem, an image measuring apparatus according to an embodiment of the present invention comprises: an imaging device that images a workpiece to acquire an image of this workpiece; and a processing device that performs the likes of dimensional measurement or form measurement of the workpiece based on this image and outputs a measurement result of the likes of a central position or a form, contour line, width, and so on, of a measurement target. Moreover, the processing device, based on the above-described image, generates another image whose number-of-pixels is smaller than that of the above-described image, sets a plurality of regions based on this another image, and calculates the above-described measurement result based on these plurality of regions.

For example, the above-described processing device may perform edge detection along a contour line of the above-described region to acquire an edge point group. In addition, the above-described processing device may exclude some of a plurality of edge points included in this edge point group. Moreover, the above-described processing device may set a plurality of respectively different numbers for the above-described plurality of regions.

A computer-readable non-temporary recording medium according to an embodiment of the present invention records a control program of an image measuring apparatus. The image measuring apparatus comprises: an imaging device that images a workpiece to acquire an image of the workpiece; and a processing device that performs the likes of dimensional measurement or form measurement of the workpiece based on this image and outputs a measurement result of the likes of a central position or a form, contour line, width, and so on, of a measurement target, and this control program controls the image measuring apparatus to perform calculation of the measurement result. Moreover, by this program, the processing device, based on the above-described image, generates another image whose number-of-pixels is smaller than that of the above-described image, sets a plurality of regions based on this another image, and calculates the above-described measurement result based on these plurality of regions.

The present invention makes it possible to provide an image measuring apparatus capable of preferably performing the likes of dimensional measurement or form measurement, and to provide a non-temporary recording medium on which a control program of the image measuring apparatus is recorded.

First Embodiment

Next, a first embodiment of the present invention will be described in detail with reference to the drawings.

First, a schematic configuration of an image measuring apparatus according to the present embodiment will be described with reference to FIG. 1.

Figure 1:
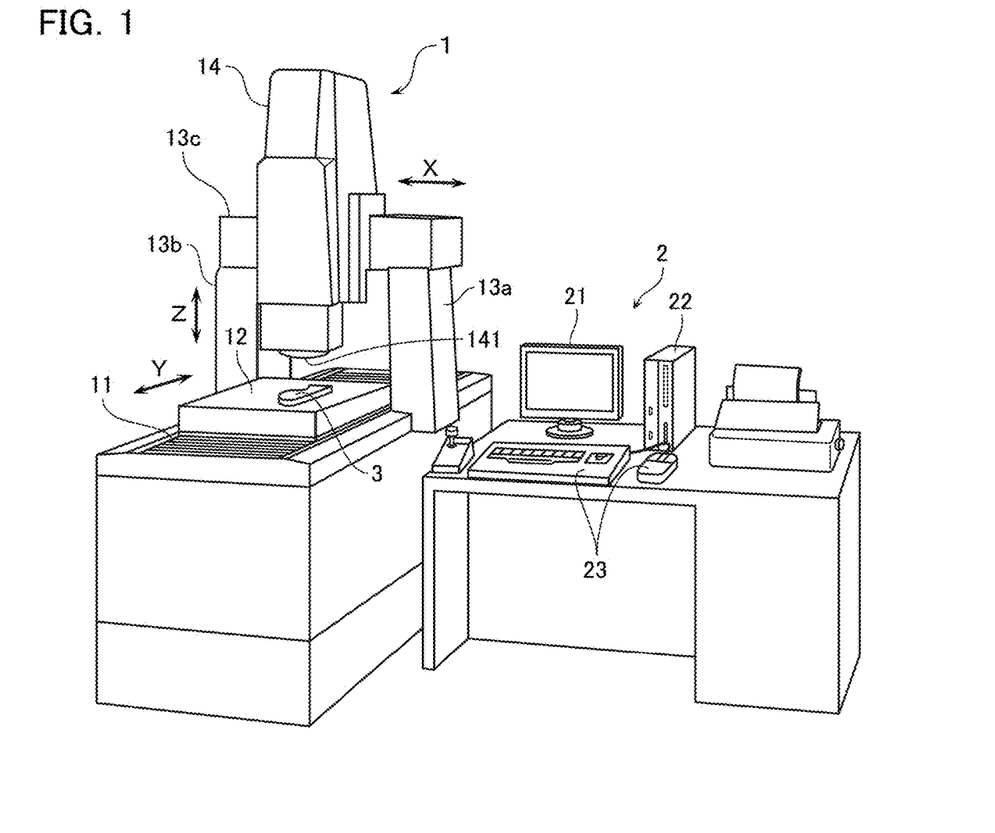
FIG. 1 is a general view of an image measuring apparatus according to a first embodiment of the present invention.

As shown in FIG. 1, the image measuring apparatus according to the present embodiment comprises: an image measuring instrument 1 that comprises mutually orthogonal X, Y, and Z axes, and has a camera 141 mounted as an imaging device that images a workpiece 3, at an extremity of this Z axis; and a computer (hereafter, called "PC") 2 connected to this image measuring instrument 1.

The image measuring instrument 1 is configured as follows. That is, a workstage 12 is mounted on a sample moving means 11, so that an upper surface of the workstage 12 acting as a base surface coincides with a horizontal plane, and an X axis guide 13c is supported by upper ends of arm support bodies 13a and 13b erected from edges on both sides of the sample moving means 11. The workstage 12 is driven in a Y axis direction by the sample moving means 11. An imaging unit 14 is supported drivably in an X axis direction, in the X axis guide 13c. The camera 141 is mounted drivably in a Z axis direction, at a lower end of the imaging unit 14.

Note that the present embodiment adopts a system where the workpiece 3 disposed on the workstage 12 is imaged, but another system is of course possible, for example, a system of the kind where a workpiece disposed on a floor is imaged from a lateral direction, is possible. In addition, various kinds of cameras such as CCD and CMOS are usable as the camera 141. Moreover, an image probe attachable/detachable to/from the image measuring instrument 1 may also be adopted as the camera 141.

The PC 2 comprises: a processing device 22; and a display device 21 and input device 23 that are connected to this processing device 22. The processing device 22 comprises internally a CPU and a storage device such as a hard disk or the like. The display device 21 is the likes of a display or projector, for example. The input device 23 is an operation input device into which an operation of a measurer is inputted, and is, for example, a mouse, a keyboard, a touch panel, or the like.

Next, a picture displayed on a screen of the display device 21 will be described with reference to FIG. 2.

Figure 2:
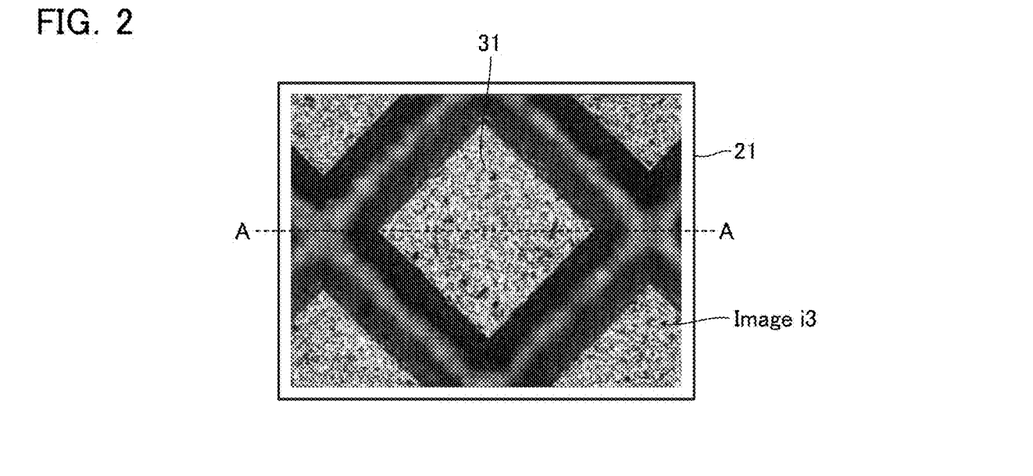
FIG. 2 shows a display screen of an image of a workpiece acquired by the same image measuring apparatus.

As shown in FIG. 2, an image of the workpiece 3 acquired by the camera 141 (hereafter, notated as image i3 in the drawings) is displayed on the screen of the display device 21. In the example shown in FIG. 2, the workpiece 3 includes a measurement target 31.

Next, a configuration of the processing device 22 according to the present embodiment will be described in more detail with reference to FIG. 3.

Figure 3:
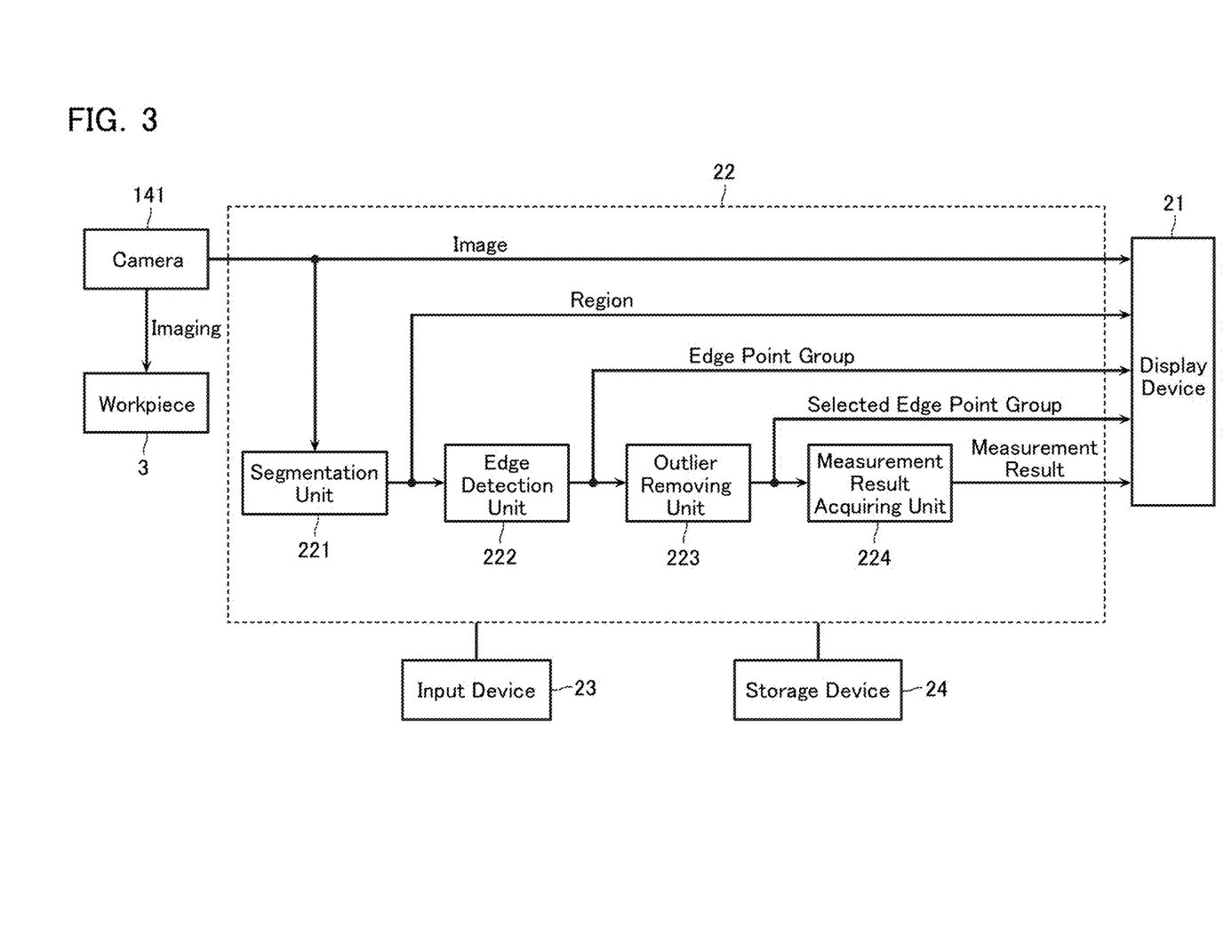
FIG. 3 is a block diagram showing a configuration of the same image measuring apparatus.

As shown in FIG. 3, in the image measuring apparatus according to the present embodiment, the camera 141 images the workpiece 3 and acquires an image of the workpiece 3. Moreover, this image is transferred to the display device 21 via the processing device 22. Moreover, the processing device 22 receives an operation of the measurer via the input device 23, and performs measurement (dimensional measurement or form measurement, and so on) of the workpiece 3 based on operation. For example, the processing device 22 extracts a portion representing a measurement target from within the image, and calculates a value related to position such as a centroid, or a value related to form such as a contour line, width, and so on, for this measurement target.

Figure 7:
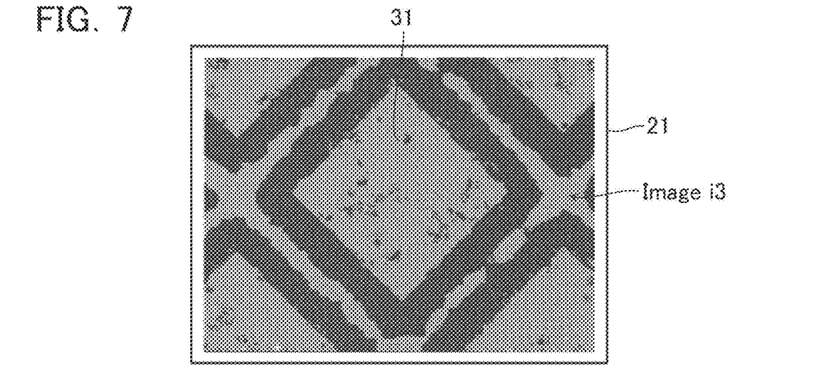
FIG. 7 shows a display screen displaying a region set in the image of the workpiece in the same operation.
Figure 8:
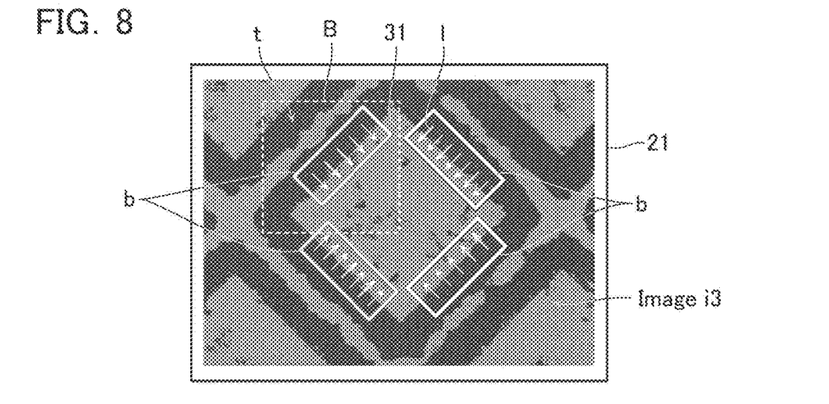
FIG. 8 shows a display screen displaying an edge detection tool used in the same operation.
Figure 9:
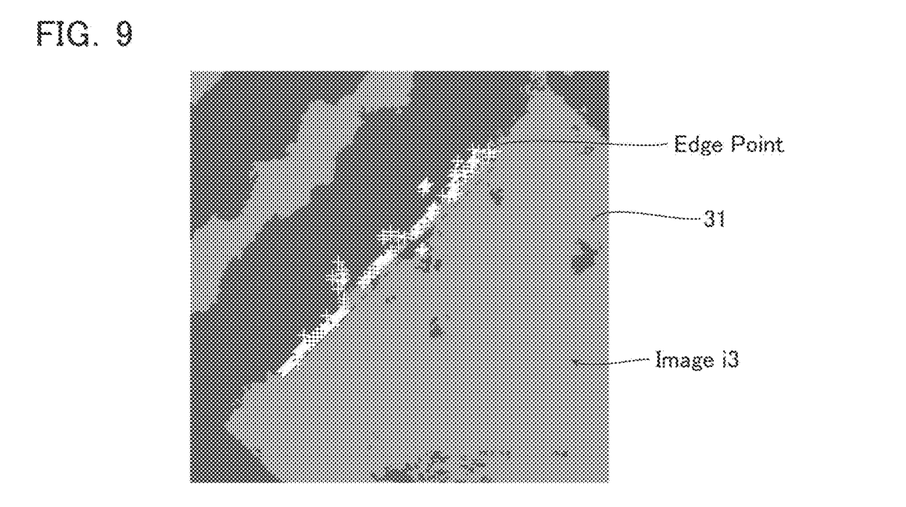
FIG. 9 is an enlarged view of the portion indicated by B of FIG. 8.
Figure 10:
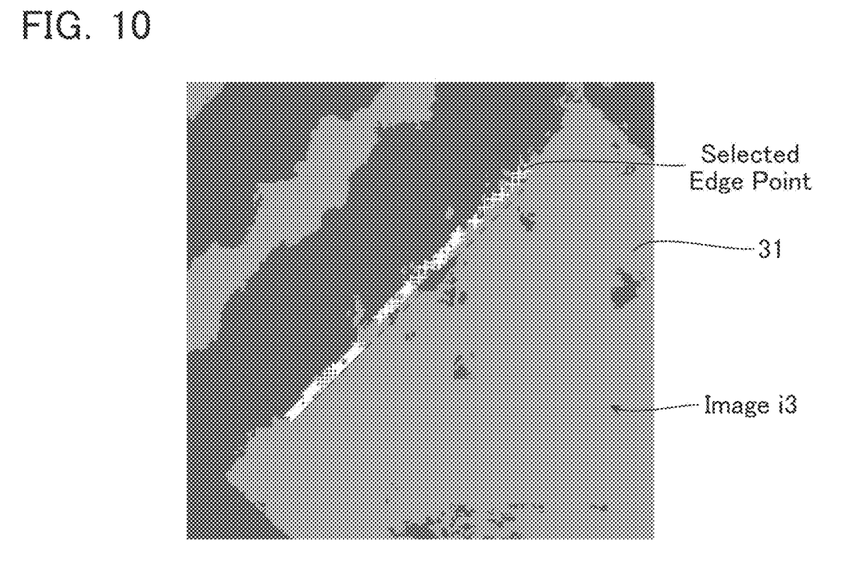
FIG. 10 shows a plurality of edge points selected from edge points of FIG. 9.

As shown in FIG. 3, the processing device 22 achieves a function described below by a CPU, a memory and a program stored in the likes of a hard disk (a storage device 24). That is, a segmentation unit 221 performs segmentation processing on the image of the workpiece 3. For example, as shown in FIG. 7, the segmentation unit 221 performs segmentation processing in the image to segment this image into a plurality of regions (segments), and outputs these plurality of regions. An edge detection unit 222, as shown in FIGS. 8 and 9, for example, performs edge detection on a contour line of the outputted region, and acquires an edge point group including a plurality of edge points. An outlier removing unit 223, as shown in FIG. 10, for example, removes some of the plurality of edge points judging them to be outliers, and acquires the remainder as a selected edge point group. A measurement result acquiring unit 224 acquires the measurement result, based on this selected edge point group.

Next, an operation of the image measuring apparatus according to the present embodiment will be described with reference to FIGS. 4 to 11.

As shown in FIGS. 4 to 7, in step S101, segmentation processing is performed on the image of the workpiece 3. The segmentation processing may be performed in a variety of modes, but, hereafter, a method employing an image pyramid will be exemplified. Note that the image pyramid refers to a set of identical images whose resolutions (numbers-of-pixels) are different, like that shown in FIG. 5, for example.

Figure 5:
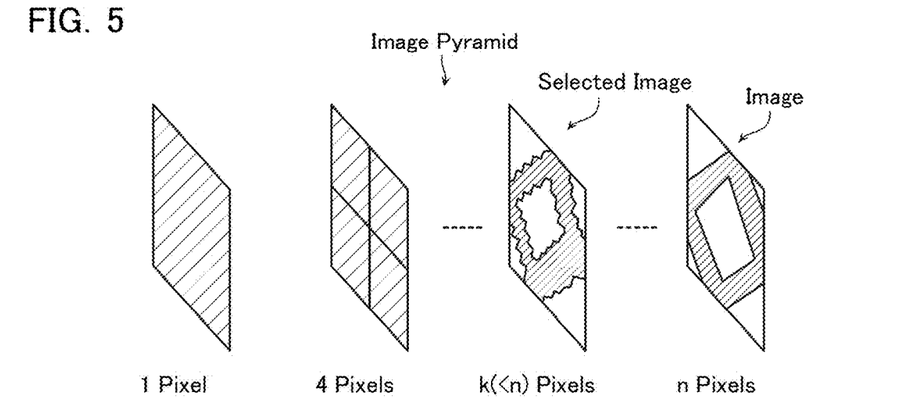
FIG. 5 shows an image pyramid generated in the same operation.

As shown in FIG. 5, in step S101, for example, the image pyramid is generated based on the image of the workpiece 3. For example, as shown in FIG. 5, when the image of the workpiece 3 is an image of n pixels, tones of pixels adjacent in an up-and-down and right-and-left manner, for example, are averaged to generate an image whose number-of-pixels is smaller than that of a first image. Next, a similar processing is performed also on this generated image, and an image whose number-of-pixels is even smaller is generated. Similarly thereafter, images are sequentially generated so that a newly generated image becomes one whose number-of-pixels is smaller than that of its predecessor image, and the image pyramid is generated. Next, an image of k (<n) pixels is selected from the plurality of images included in this image pyramid.

Figure 6:
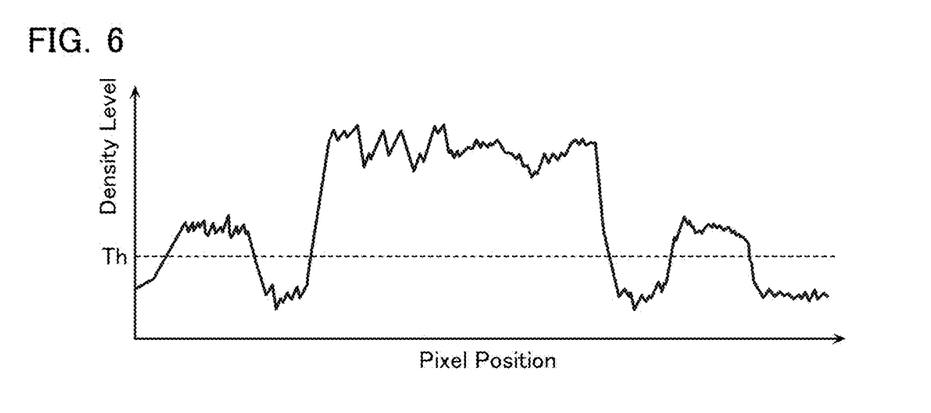
FIG. 6 is a graph showing a relationship of a pixel position and a density level along the line AA of FIG. 2.

In addition, as shown in FIGS. 6 and 7, in step S101, for example, a plurality of regions are set in this selected image of k pixels. Setting of the regions may be performed in a variety of modes, but in the example shown in FIG. 6, setting of the regions is performed such that one portion including pixels whose density levels (tone) are higher than a threshold value Th and another portion including pixels whose density levels (tone) are lower than the threshold value Th are segmented to different regions. Note that when setting the regions according to the density level (tone) of each pixel, it is also possible for a plurality of threshold values Th to be set. Moreover, it is also possible to determine the likes of a rough position of each region based on the above-described image of k pixels, and determine in detail a boundary of each region based on the image of n pixels acquired by the camera 141.

Figure 4:
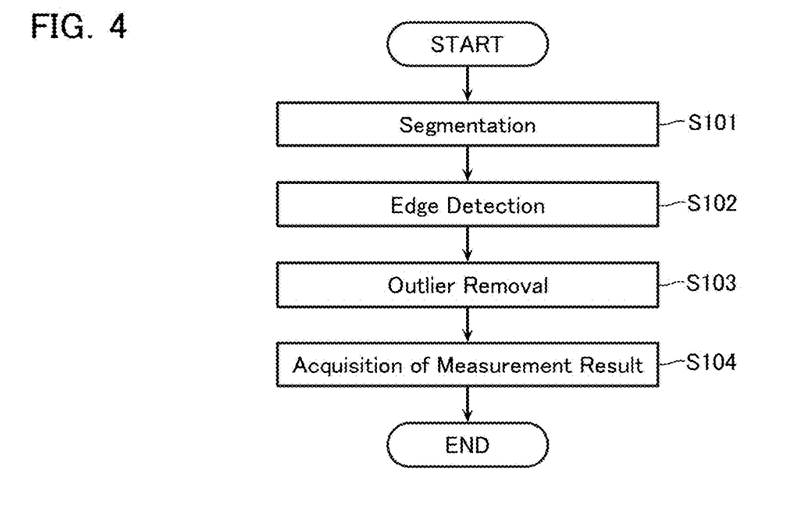
FIG. 4 is a flowchart showing an operation of the same image measuring apparatus.

As shown in FIGS. 4, 8, and 9, in step S102, edge detection is performed on at least one of the plurality of regions acquired in step S101, and a plurality of edge points are acquired. The edge detection may be performed in a variety of modes, but in the example shown in FIG. 8, an edge detection-dedicated tool t is used. The edge detection-dedicated tool t exemplified in FIG. 8 includes four boxes b, and each box b has a rectangular form extending along a contour line of the region corresponding to the measurement target 31. Moreover, in each box b, a plurality of line segments 1 each extending in a transverse direction of the box b are provided along a longitudinal direction of the box b. In the edge detection, as shown in FIG. 8, each box b is superimposed on the contour of the measurement target 31, and a pixel having a largest change (gradient) of density level along the line segment 1 in the box b is acquired as the edge point.

As shown in FIGS. 4 and 10, in step S103, outlier detection is performed to remove outliers from the plurality of edge points shown in FIG. 9, and acquire selected edge points. The outlier detection may be performed in a variety of modes, but, for example, it is possible to set an approximate straight line (approximate curve) in the plurality of edge points acquired in step S102, calculate a distance from this approximate straight line (approximate curve) to each edge point, and judge the outliers based on a mean value and a variance of the calculated distances.

Figure 11:
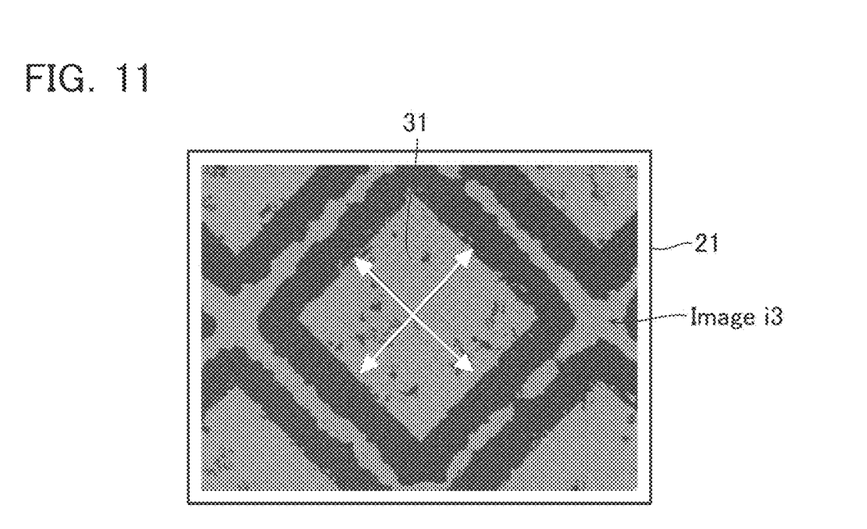
FIG. 11 shows a display screen displaying a measurement result acquired in the same operation.

As shown in FIGS. 4 and 11, in step S104, a result of measurement is acquired based on the plurality of selected edge points acquired in step S103, for example. In step S104, a variety of values, such as a centroid or a contour line, a width, and so on, of a measurement target (for example, the measurement target 31), can be calculated.

Figure 12:
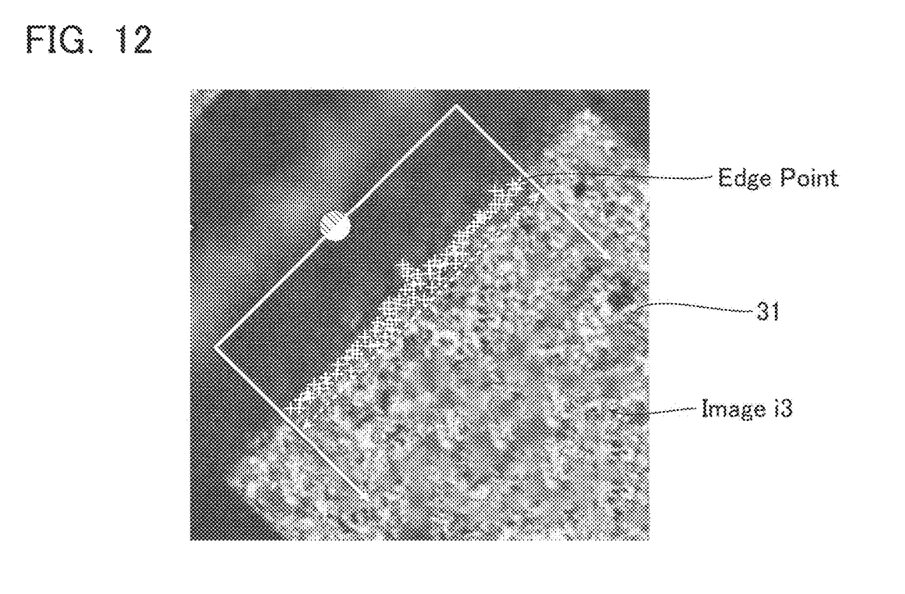
FIG. 12 shows a plurality of edge points acquired in a conventional image measuring apparatus.
Figure 13:
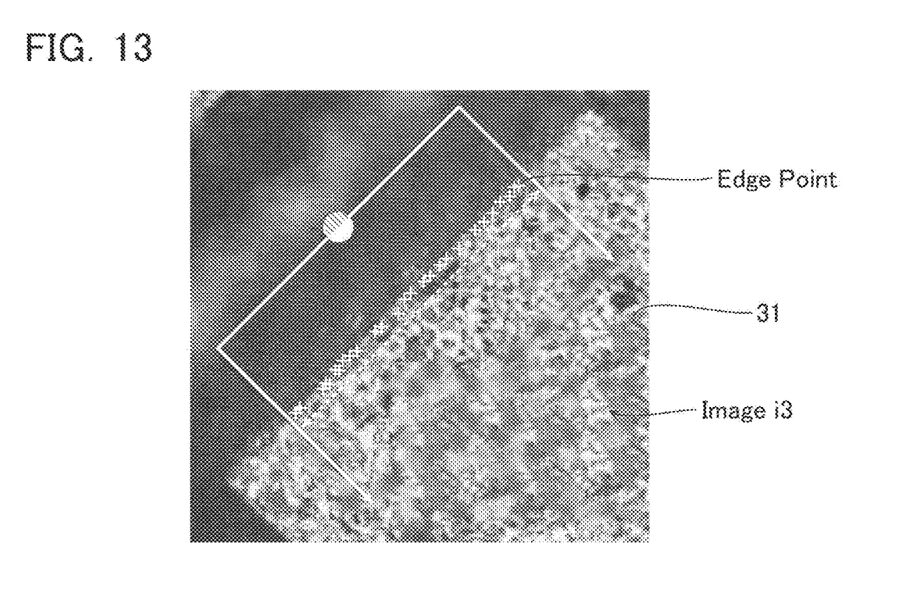
FIG. 13 shows a plurality of edge points selected from the edge points of FIG. 12.

Now, in a conventional image measuring apparatus, when edge detection was performed directly on the image acquired by the camera 141, sometimes, as shown in FIG. 12, many points distant from the contour of the measurement target 31 ended up being calculated as edge points, due to an effect of noise included in the image. When outlier detection was performed on such an image, sometimes, as shown in FIG. 13, many edge points ended up being removed and precision of measurement was affected.

Figure 14:
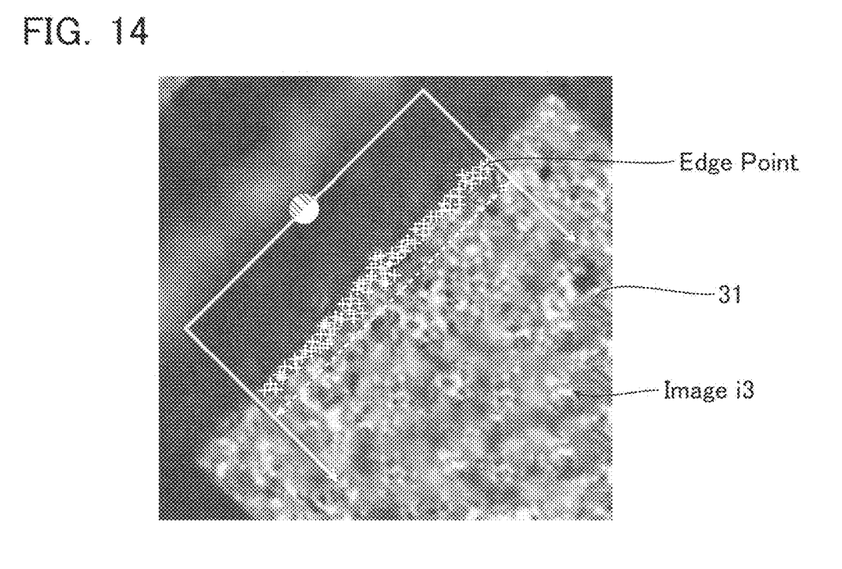
FIG. 14 shows a plurality of edge points acquired from an image after filtering in the conventional image measuring apparatus.
Figure 15:
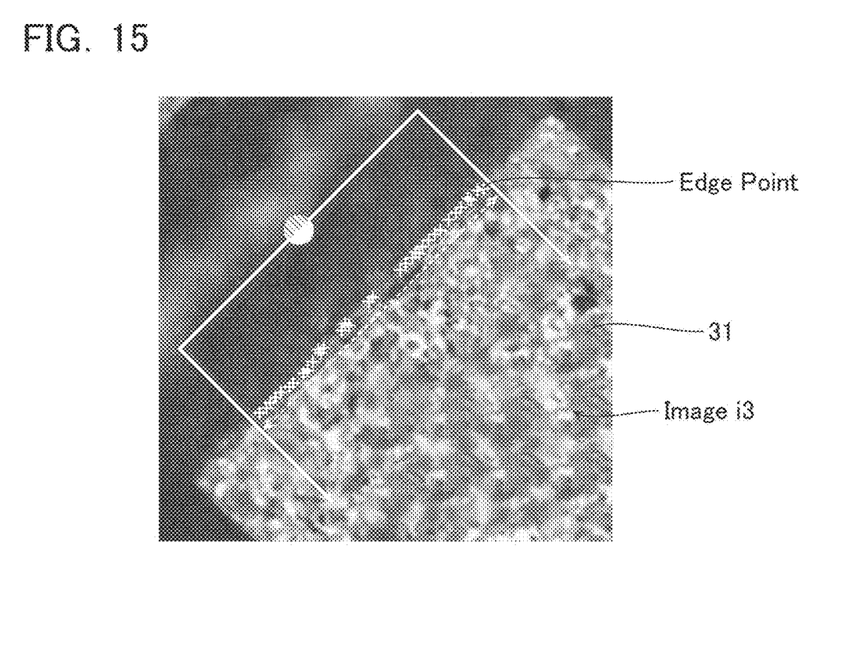
FIG. 15 shows a plurality of edge points selected from the edge points of FIG. 14.

In view of such a point, in the conventional image measuring apparatus, sometimes, image processing such as filtering was performed beforehand on the image acquired by the camera 141, and noise in the image was reduced, after which edge detection was performed. Sometimes employed in such filtering was, for example, an image filter, such as a median filter, an averaging filter, a Gaussian filter, or a morphology filter. However, even when image processing such as filtering was performed in this way, sometimes, as shown in FIG. 14, many points distant from the contour of the measurement target 31 ended up being calculated as edge points. Therefore, even when outlier detection was performed on such an image, sometimes, as shown in FIG. 15, many edge points ended up being removed and precision of measurement was affected.

In contrast with such cases, in the first embodiment, segmentation processing is performed on the image acquired by the camera 141 to segment the image into a plurality of regions (refer to FIG. 7), edge detection is performed on at least some of these plurality of regions (refer to FIG. 8), outlier detection is performed on the plurality of edge points acquired by this edge detection (refer to FIG. 10), and the measurement result is acquired based on a result of the outlier detection (refer to FIG. 11). Therefore, it is possible to preferably reduce noise close to the contour of the measurement target 31 as shown in FIG. 7, and to preferably acquire a large number of edge points on the contour of the measurement target 31 as shown in FIG. 9. Moreover, it is possible to further reduce the number of edge points removed in the outlier detection, compared to in the above-mentioned cases.

Note that in the example described with reference to FIGS. 4 to 11, segmentation processing was performed using the image pyramid. That is, a rough position, and so on, of each region was determined based on an image whose number-of-pixels was smaller than that of the image acquired by the camera 141. Now, in the image whose number-of-pixels is small, noise included in its predecessor image is significantly reduced. Therefore, by determining the rough position, and so on, of each region based on this image, it is possible to determine a contour of each region while reducing an effect of noise close to the contour of the measurement target 31.

Moreover, as mentioned above, in the above-described segmentation processing, it is also possible to determine the likes of the rough position of each region based on the above-described image of k pixels, and determine in detail the boundary of each region based on the image of n pixels acquired by the camera 141. In such a case, the contour of the above-described region can be determined based on the image of n pixels, hence a detailed measurement can be performed while reducing noise. Note that it is also possible to perform a high speed rough processing by calculating the measurement result based on the image of k pixels.

Second Embodiment

Next, an image measuring apparatus according to a second embodiment of the present invention will be described with reference to FIGS. 16 and 17. Note that in the description below, portions similar to those of the first embodiment will be assigned with identical reference symbols to those assigned in the first embodiment, and descriptions thereof will be omitted.

Figure 16:
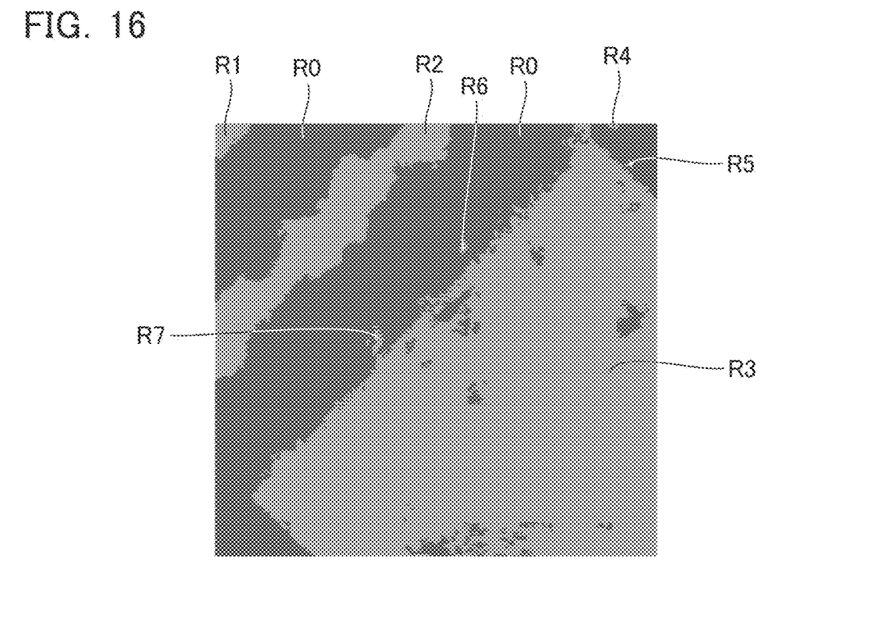
FIG. 16 shows regions set in an image of a workpiece by an image measuring apparatus according to a second embodiment of the present invention.
Figure 17:
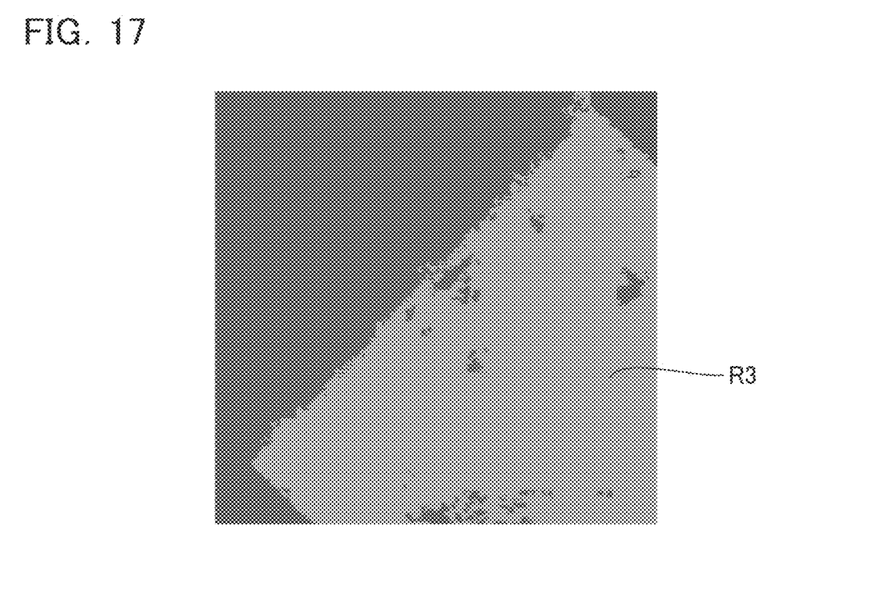
FIG. 17 shows a region extracted from the regions of FIG. 16.

The image measuring apparatus according to the present embodiment is basically configured similarly to that of the first embodiment, but in the present embodiment, as shown in FIG. 16, after performing the segmentation processing, different numbers are assigned to each region. For example, a region R1 in FIG. 16 is assigned with the number "1", and a region R2 in FIG. 16 is assigned with the number "2". Moreover, subsequently, as shown in FIG. 17, a region R3 corresponding to the measurement target 31 is extracted, and the measurement result is acquired based on this extracted region.

In the present embodiment, as shown in FIG. 16, regions R6 and R7 corresponding to noise portions are assigned with different numbers from the region R3 corresponding to the measurement target 31. Therefore, at a time point when the region R3 corresponding to the measurement target 31 is extracted, noise close to the contour of the measurement target 31 can be preferably reduced.

Note that in the present embodiment, it is also possible for the extracted region R3 to undergo processing of the likes of edge detection and outlier detection similarly to in the first embodiment and for the measurement result to be acquired based on a result of that processing. Moreover, the measurement result may also be acquired by performing another processing.

In addition, sometimes, as shown in FIG. 16, the regions R6 and R7 corresponding to noise portions have smaller areas compared to another region. Therefore, it is also possible that when, for example, after a threshold value has been set beforehand for area of a region and different numbers have been assigned to each region, there exist regions R6 and R7 of the kind where area is less than or equal to the threshold value, these regions R6 and R7 are judged to be regions corresponding to noise components and are excluded during calculation of the measurement result.

Other Embodiments

In the first embodiment, the likes of edge detection or outlier detection were performed, but it is also possible for these processings to be omitted or replaced by another processing. Moreover, it is also possible for these processings to be performed in combination with the above-described image processing such as filtering.

Moreover, the present invention, in addition to being able to be applied in the case of using the three-dimensional image measuring instrument in which the camera 141 is configured to be drivable in the Z axis direction and which is capable of measuring a coordinate in the Z axis direction, may be applied also in the case of using a two-dimensional image measuring instrument or a microscope having an image measuring function.

What is claimed is:

1. An image measuring apparatus, comprising:
an imaging device that images a workpiece to acquire an image of the workpiece; and
a processing device that performs measurement of the workpiece based on the image and outputs a measurement result,
the processing device
based on the image, generating another image whose number-of-pixels is smaller than that of the image,
setting a plurality of regions by segmenting one portion of the another image including pixels whose density levels are higher than a threshold value and another portion of the another image including pixels whose density levels are lower than the threshold value to different regions, and
calculating the measurement result based on the plurality of regions.

2. The image measuring apparatus according to claim 1, wherein
the processing device performs edge detection along a contour line of the region to acquire an edge point group.

3. The image measuring apparatus according to claim 2, wherein
the processing device excludes some of a plurality of edge points included in the edge point group.

4. The image measuring apparatus according to claim 3, wherein
the processing device
sets an approximate straight line or an approximate curve in the edge point group,
calculates a distance from the approximate straight line or the approximate curve to the edge point, and
excludes some of the plurality of edge points based on a mean value and a variance of the calculated distances.

5. The image measuring apparatus according to claim 1, wherein
the processing device sets a plurality of respectively different numbers for the plurality of regions.

6. The image measuring apparatus according to claim 4, wherein
the processing device sets a plurality of respectively different numbers for the plurality of regions.

7. The image measuring apparatus according to claim 1, wherein
the processing device
extracts one of the plurality of regions, and
calculates the measurement result based on the extracted regions.

8. A non-temporary recording medium which is computer-readable and has recorded thereon a control program of an image measuring apparatus,
the image measuring apparatus comprising:
an imaging device that images a workpiece to acquire an image of the workpiece; and
a processing device that performs measurement of the workpiece based on the image and outputs a measurement result,
the control program of the image measuring apparatus controlling the image measuring apparatus to perform calculation of the measurement result,
the control program, by the processing device,
based on the image, generating another image whose number-of-pixels is smaller than that of the image,
setting a plurality of regions by segmenting one portion of the another image including pixels whose density levels are higher than a threshold value and another portion of the another image including pixels whose density levels are lower than the threshold value to different regions, and
calculating the measurement result based on the plurality of regions.

9. The non-temporary recording medium according to claim 8, wherein
the program, by the processing device, performs edge detection along a contour line of the region to acquire an edge point group.

10. The non-temporary recording medium according to claim 9, wherein
the program, by the processing device, excludes some of a plurality of edge points included in the edge point group.

11. The non-temporary recording medium according to claim 10, wherein
the program, by the processing device,
sets an approximate straight line or an approximate curve in the edge point group,
calculates a distance from the approximate straight line or the approximate curve to the edge point, and
excludes some of the plurality of edge points based on a mean value and a variance of the calculated distances.

12. The non-temporary recording medium according to claim 8, wherein
the program, by the processing device, sets a plurality of respectively different numbers for the plurality of regions.

13. The non-temporary recording medium according to claim 8, wherein
the program, by the processing device,
extracts one of the plurality of regions, and
calculates the measurement result based on the extracted regions.

14. An image measuring apparatus, comprising:
an imaging device that images a workpiece to acquire an image of the workpiece; and
a processing device that performs measurement of the workpiece based on the image and outputs a measurement result,
the processing device
based on the image, generating another image whose number-of-pixels is smaller than that of the image,
setting a plurality of regions based on the another image, performing edge detection along a contour line of the region to acquire an edge point group, excluding some of a plurality of edge points included in the edge point group, setting an approximate straight line or an approximate curve in the edge point group, calculating a distance from the approximate straight line or the approximate curve to the edge point, excluding some of the plurality of edge points based on a mean value and a variance of the calculated distances, and calculating the measurement result based on the plurality of regions.

15. The image measuring apparatus according to claim 14, wherein the processing device sets a plurality of respectively different numbers for the plurality of regions.

16. The image measuring apparatus according to claim 14, wherein the processing device extracts one of the plurality of regions, and calculates the measurement result based on the extracted regions.

* * * * *